(12) United States Patent
Oguri

(10) Patent No.: US 6,356,049 B2
(45) Date of Patent: Mar. 12, 2002

(54) POWER SUPPLY COUPLER FOR BATTERY CHARGER

(75) Inventor: Koji Oguri, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/730,301

(22) Filed: Dec. 5, 2000

(30) Foreign Application Priority Data

Dec. 7, 1999 (JP) .............................. 11-347774

(51) Int. Cl.[7] .................................................. H02J 7/00
(52) U.S. Cl. ...................................... 320/101; 320/107
(58) Field of Search ................................ 320/101, 107, 320/108; 429/99, 100

(56) References Cited

U.S. PATENT DOCUMENTS 5,461,299 A  * 10/1995  Bruni ........................ 320/108
5,646,500 A  * 7/1997   Wilson ...................... 320/108
5,719,483 A  * 2/1998   Abbott et al. ............. 320/108
5,909,100 A  * 6/1999   Watanabe et al. ......... 320/108

FOREIGN PATENT DOCUMENTS

JP          2000-114080         4/2000

* cited by examiner

Primary Examiner—Peter S. Wong
Assistant Examiner—Lawrence Luk
(74) Attorney, Agent, or Firm—Morgan & Finnegan, LLP

(57) ABSTRACT

A power supply coupler for a battery charging device that includes a core, a coil surrounding the core, and a plastic case enclosing the core and the coil. The coil is electrically connected to a power supply device of the battery charging device with a cable. The power supply coupler has an interconnection member located between the coil and the case for transferring impact forces acting on the case to the coil.

15 Claims, 4 Drawing Sheets

POWER SUPPLY COUPLER FOR BATTERY CHARGER

BACKGROUND OF THE INVENTION

This invention relates to power supply couplers for battery chargers and, more particularly, to a power supply coupler suited for use with a battery charger for battery-powered electric vehicles.

It has been proposed to employ a non-contact, electromagnetic induction type battery charging device in an electric vehicle. The battery charging device usually includes a power supply charging paddle, which is connected with a cable to a stationary power supply device. The paddle is inserted into a power receiver coupler mounted in the electric vehicle to charge the vehicle battery.

The power supply coupler includes a case that forms a paddle-shaped plug, which is inserted into the power receiver coupler. The case forms a hollow interior space. A primary core is located in the hollow space, and a primary coil is located around the core within the hollow space.

The power receiver coupler also has a hollow case and forms a receptacle to receive the plug. The receptacle case encloses a secondary core and a secondary coil, which is located around the core.

When the power supply coupler is inserted into the power supply receiver, the core of the power supply coupler is aligned with the core of the power receiver coupler to form a magnetic path, and the primary coil is located in concentric relation with the secondary coil. If the primary coil is supplied with an electric power from the power supply device, an electric current is induced in the secondary coil. This inductive electric current is converted into a D.C. current, which charges into the battery of the electric vehicle.

The case of the power supply coupler is usually made of plastic to prevent electric leakage or electric shock. The case has an upper half and a lower half, which are mated. The coupler halves each have a thin-walled configuration including a cylindrical wall. The lower portion of the case is fitted into a hole defined by the corresponding cylindrical wall, and the lower portion of the primary coil is fixed to an outer surface of the cylindrical wall of the lower coupler half. Likewise, an upper portion of the core is fitted in a hole defined by the upper cylindrical wall, and the upper cylindrical wall in fitted a bore defined by the primary coil to form the power supply coupler. The two half are fixed to one another.

When handling the power supply coupler, the power supply coupler is frequently subjected strong impacts. For example, a person's hand is apt to be erroneously removed from the power supply coupler during its insertion or removal from the power receiver coupler. When this happens, the plastic case of the power supply coupler tends to collide against a hard surface such as the ground and, which damages the power supply coupler. Since the plug portion of the power supply coupler has a rounded edge to facilitate insertion, the rounded edge is subjected to a large force per unit area when it collides against the ground surface. For this reason, the case is easily damaged.

SUMMARY OF THE INVENTION

It is therefore an object of the present invention to provide a highly reliable power supply coupler for a battery charger.

In order to meet the above and other objects, the present invention provides a power supply coupler for a battery charger. The power supply coupler includes a hollow case, a core accommodated in the hollow case, a coil located around the core in the case, and an interconnection member located between the coil and the case to transfer impact forces to the coil.

The present invention further provides a power supply coupler for a battery charger including a plastic case, one end of which has a paddle shape, a core, which is accommodated in the paddle-shaped portion of the case, a coil located around the core, and an interconnection member located between one part of the paddle-shaped portion of the case and the coil for transferring impact forces applied to an edge of the paddle-shaped portion to the coil.

Other aspects and advantages of the invention will become more apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings, in which.

DETAILED DESCRIPTION OF THE PREFERRED EMBODIMENTS

Preferred embodiments of a power supply coupler according to the present invention will now be described with reference to the drawings. The power supply coupler is intended to be used with a non-contact, electromagnetic induction type battery charging device for charging a battery of an electric vehicle.

Figure 1:
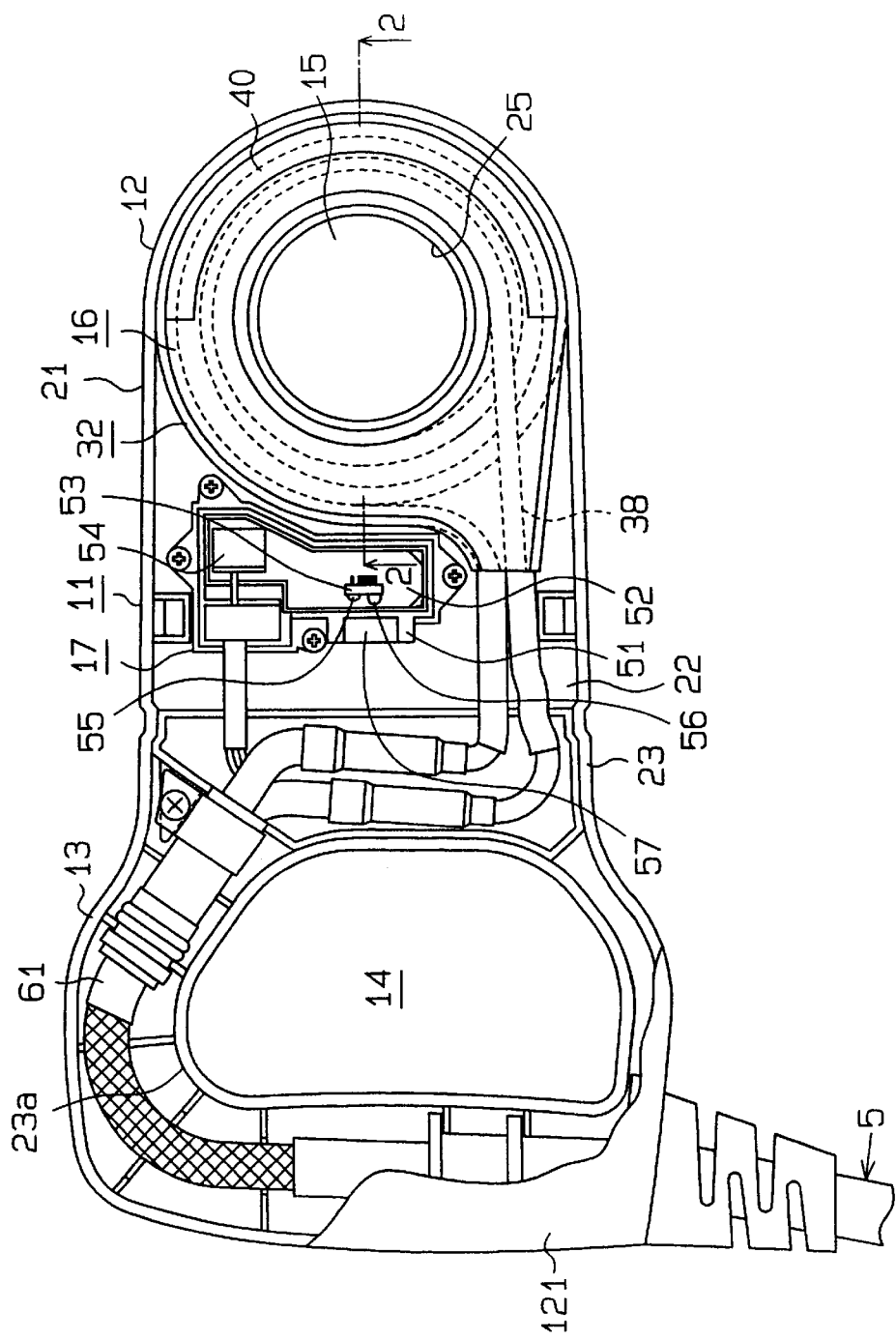
FIG. 1 is a front view of a power supply coupler of a preferred embodiment of the present invention, with parts removed for illustrative purposes.

As shown in FIG. 1, the power supply coupler has a case 11. A distal end of the case forms an inserter portion 12, which is adapted to be inserted into a power receiver coupler. The proximate end of the case 11 forms a handle or grip 13, which is gripped by a person when charging a battery. The inserter portion 12 has a paddle shape. The grip 13 has a plate-like configuration. The grip 13 has a gripping aperture 14 to accommodate fingers.

A core 15 is fitted in a bore formed in the inserter portion 12 of the case 11 such that the end of the core 15 are exposed. A coil 16 is located around the core 15 in a hollow space of the case 11. The details of the construction of the case 11 will be discussed below.

The case 11 includes a lower coupler half 21 and an upper coupler half 121, which are joined in the assembly process. The coupler halves 21 and 121 are made of electrically insulative plastic that transmits infrared light. Further, the lower coupler half 21 and the upper coupler half 121 are symmetric to allow insertion of the power supply coupler into the power receiver coupler in either of two orientations.

Figure 2:
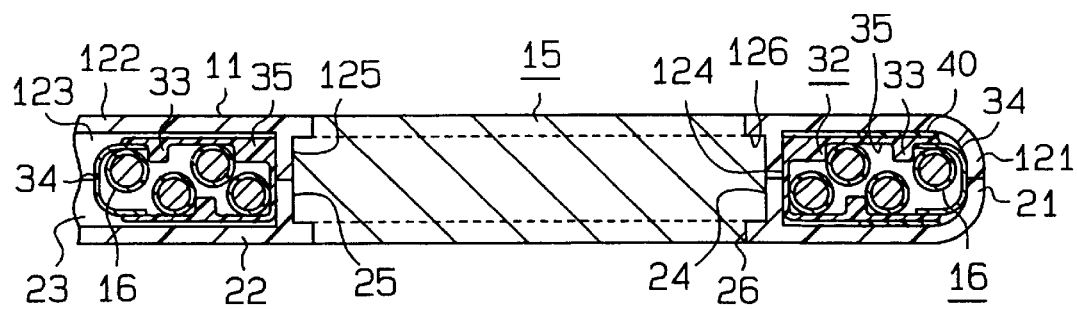
FIG. 2 is a cross sectional view of the power supply coupler taken on line 2—2 of FIG. 1.
Figure 3:
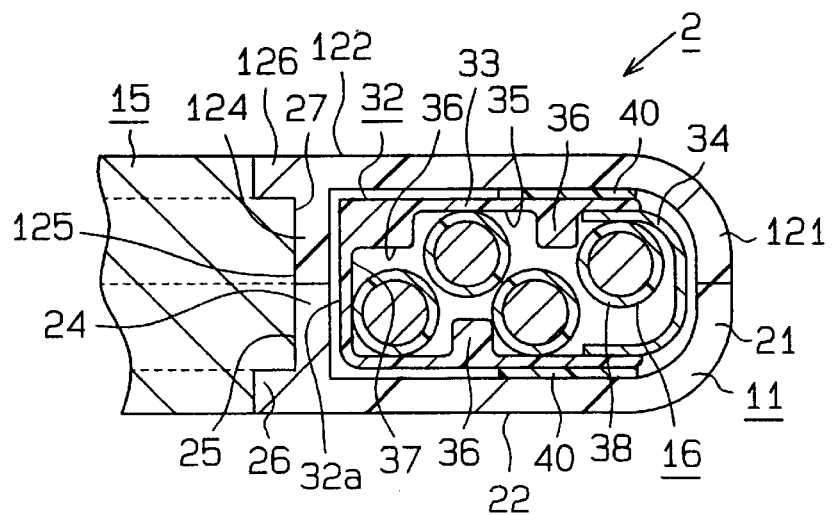
FIG. 3 is an enlarged cross sectional view showing an end portion of the power supply coupler shown in FIG. 2.

The lower coupler half 21 has a side wall 22 and a peripheral wall 23 form the grip 13. The grip 13 extends from the side wall 22 and has a grip opening 14. The grip 13 has an inner wall 23a formed around the grip opening 14. The inner wall 23a has the same height as the peripheral wall 23. As shown in FIG. 2, the inserter portion 12 of the lower half 21 is formed with a cylindrical wall section 24 that defines a hole 25. As seen in FIG. 3, a radial wall 26 extends from the cylindrical wall section 24.

Likewise, the upper coupler half 121 has the same configuration as the lower coupler half 21. The side wall, the cylindrical wall section, the hole and the radial wall of upper coupler half are designated by reference numerals 122, 124, 125 and 126, respectively.

The thickness of the core 15 is substantially equal to the thickness of the case 11, and the core 15 is cylindrical. As best seen in FIG. 3, the outer periphery of the core 15 is formed with an annular protrusion 27. The center of the protrusion 27 is located at the center of the core 15. The annular protrusion 27 is placed between the radial walls 26, 26 of the lower and upper coupler halves 21 and 121 and is fitted in the holes 25, 125 of the lower and upper coupler halves 21 and 121.

As best shown in FIG. 3, the coil 16 is incorporated in a bobbin 32, which includes a bobbin body 33 and a cover 34. The bobbin body 33 is channel-shaped in cross section. The bobbin body 33 has a center hole 32a, which is slightly larger than the outer surface of the cylindrical wall sections 24, 124 of the lower and upper coupler halves 21, 121. As seen in FIG. 3, the bobbin body 33 has parallel walls 35 formed with a plurality of inwardly projecting protrusions 36 which are located at predetermined positions. As shown in FIG. 2, the coil 16 is formed by a wire 38, which extends into the inside of the bobbin 32 through an opening formed in a portion of the bobbin body 33 and which is wound around a cylindrical wall 37 formed between the parallel walls 35. The winding space is restricted by the inner protrusions 36. The cover 34 is annular and, in cross section, channel-shaped. The cover 34 has a recess directed toward a recess of the bobbin body 33. A pair of parallel walls of the cover engage with the parallel walls 35 of the bobbin body 33, respectively, such that the cover 34 is coupled to the bobbin body 33 and the coil 16 is sealed by the bobbin body 33 and the cover 34.

A coil assembly is formed by the coil 16 and the bobbin 32. The center hole 32a receives a cylinder formed by the cylindrical wall sections 22, 122 of the lower and upper coupler halves 21 and 121.

Interconnection members 40 are located in a space between the bobbin 32 and the side walls of the case 11. As shown in FIG. 1, the interconnection members 40 serve to connect, or couple, the case 11 and the coil 16 to one another. The interconnection members 40 are made of a heat-resistant material, which resists a heat generated by the coil 16 during charging of the battery.

Each of the interconnection members 40 is located on the bobbin 32 at the distal end of the case 11. As seen in FIG. 1, more specifically, each of the interconnection members 40 has a semi-circular configuration and is located at the outer ends of the parallel walls 35 of the bobbin body 33.

Each of the interconnection members 40 is made of, for example, a potting material that is widely used in manufacturing electronic circuits. As is well known in the art, potting material resists mechanical impact and vibrations for protecting component, electronic circuits and removes moisture and limits corrosion. For this reason, potting material is employed to form the interconnection members 40.

The interconnection members 40 may be formed as follows. As an initial step, the potting material is applied to the outer sides of the parallel walls 35 of the bobbin 32, thereby forming the interconnection members 40. The coil assembly is then fitted to the cylindrical wall section 24 formed in the lower coupler half 21. The core 15 is fitted into the hole 25 of the cylindrical wall section 24 of the lower coupler half 21. Thereafter, the upper coupler half 121 is mated with the lower coupler half 21 to form a unit. The coupling of the lower and upper coupler halves 21, 121 is achieved, for example, by ultrasonic welding.

As shown in FIG. 1, the power supply coupler includes a communication unit 17 for transmissions or receiving data that is sent between the power supply coupler and the power receiver coupler with infrared light. In FIG. 1, the communication unit 17 is located in the vicinity of the center of the case 11 and is in a housing 51 which is fixed to the lower coupler half 21. The case 11 is made of transparent plastic that transmits the infrared light. The communication unit 17 includes an infrared emitter and receiver element 53 and a communication circuit 54, which are mounted on a circuit board 52 together with associated components parts. The infrared emitter and receiver element 53 has an emitter section 55 for emitting infrared light, and a receiver section 56 for receiving infrared light.

The circuit board 52 includes a reflector 57, which reflects infrared light passing through between the power supply coupler and the power receiver coupler. More specifically, the reflector 27 is arranged such that it creates the infrared light paths that extends in directions, perpendicular to both sides of the case 11. The infrared light emitted from an emitter of a communication unit of the power receiver coupler is reflected to the receiver section 56 of the power supply coupler and vice versa. Further, since the infrared light paths extends from both sides of the case 11, the reflector 57 enables communication between the power supply coupler and the power receiver coupler in either of the two possible orientations of the power supply coupler. As noted, the case 11 is made of transparent plastic to transmit infrared light, and the power receiver coupler has a case formed by the same material at the location of the infrared light path.

The communication unit 17 is connected to a controller 104 of a power supply device 103, which will be described later, via a transmission wire and a reception wire, which are components of a cable 61. The cable 61 also includes a power wire, which is electrically connected to the wire 38 that forms the coil 16. The information carried between the communication unit 17 and the power receiver coupler includes an interlock cancellation signal, which is produced when the power supply coupler 100 is inserted into the power receiver coupler 105, and a battery voltage signal, which indicates the capacity of the battery to be charged by the battery charging device.

Figure 4:
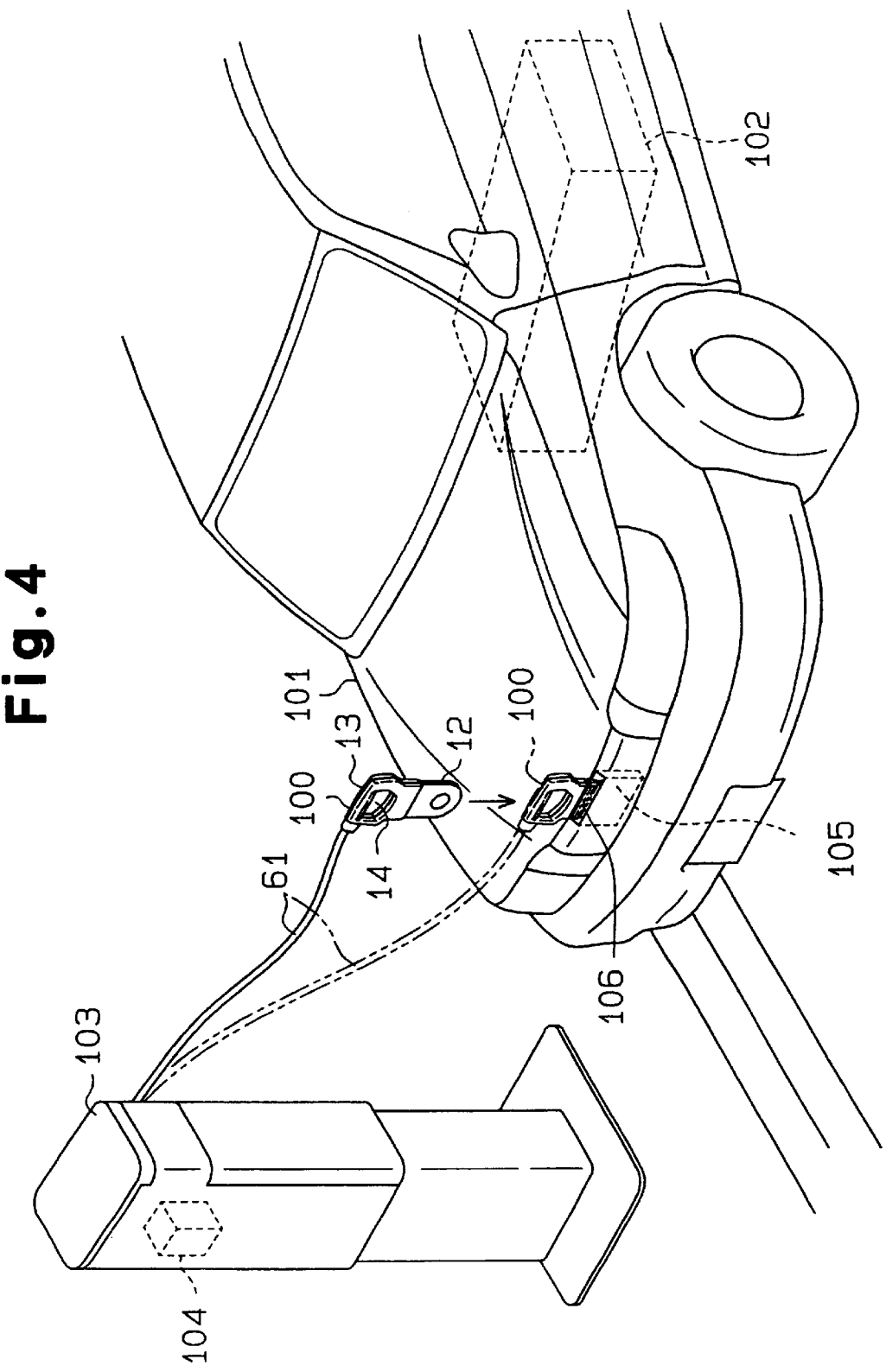
FIG. 4 is a perspective view illustrating the power supply coupler being used.

The power supply coupler 100 is used as a part of the battery charging system of the electric vehicle. FIG. 4 shows an example of the battery charging system.

In FIG. 4, the electric vehicle 101 incorporates therein an electric motor (not shown) and a battery 102. The electric motor serves as a prime mover, which is part of the drive mechanism of the electric vehicle 101. The electric vehicle 101 is propelled by the electric motor, which is powered by the battery 102.

The power supply device 103 is located in a battery charging service station. The power supply coupler 100 of the present invention is electrically connected to the controller 104 of the power supply device 103 by the cable 61.

The power receiver coupler 105 and its associated component parts are located at a front portion of the electric vehicle 101.

Charging of the battery 102 is done by inserting the power supply coupler 100 into a coupler port 106 of the power receiver coupler 105. When the power supply coupler 100 is inserted into the power receiver coupler 105, the power supply coupler 100 is positioned such that the core 15 is placed in a correct position relative to the core of the power receiver coupler 15, and the primary coil 16 is placed in a correct position relative to a secondary coil of the power receiver coupler 105. Under these conditions, the communication unit 17 of the power supply coupler 100 is in correct position to enable the transfer of data between the communication unit 17 of the power supply coupler 100 and the communication unit of the power receiver coupler 105 with the infrared light emitter and receiver element 53 and the reflector 57.

When electric power is supplied from the power supply device 103 to the primary coil 16 of the power supply coupler 100, an induction current is induced in the secondary coil of the power receiver coupler 105. This electric current is delivered to a D. C. converter (not shown), which is connected to the power receiver coupler 105 in the electric vehicle 101, and is converted into a D. C. current which charges the battery 102. The battery 102 is provided with a battery sensor (not shown), which detects the capacity of the battery, or its output voltage, to produce battery charging data. The battery charging data is delivered from the communication unit of the power receiver 105 to the communication unit 17 of the power supply coupler 100 by the infrared light. The controller 104 of the power supply device 103 responds to the battery charging data and controls the electric power supplied to the primary coil 31 of the power supply coupler 100.

When charging the battery, the operator may accidentally cause the power supply coupler 100 to strike another hard object. For example, the operator may drop the power supply coupler 100. The power supply coupler 100 usually falls with the distal end leading. Thus, the outer edge of the inserter portion 13 of the power supply coupler 100 tends to strike the ground. However, the force applied to the case 11 is transferred through the interconnection members 40 to the coil assembly. That is, the impact is applied to the case 11, and some force is transferred to the coil 16 via the bobbin 32. Thus, the impact is dissipated by the case 11 and the coil 16, and force transferred to the coil assembly is absorbed by the coil 16. Due to this shock absorption, the impact acting on the case 11 is effectively alleviated. For this reason, even though the case 11 is made of plastic, the case 11 is not broken by the impact. If a crack forms in the outer edge of the case 11, the crack does not lead to a split because of the presence of the interconnection members 40. In addition, even if the case 11 splits, the split portions are connected to each other by the interconnection members 40. The interconnection members 40 adhere the split portions to the bobbin 32 of the coil assembly to prevent the split portions from scattering.

Figure 5:
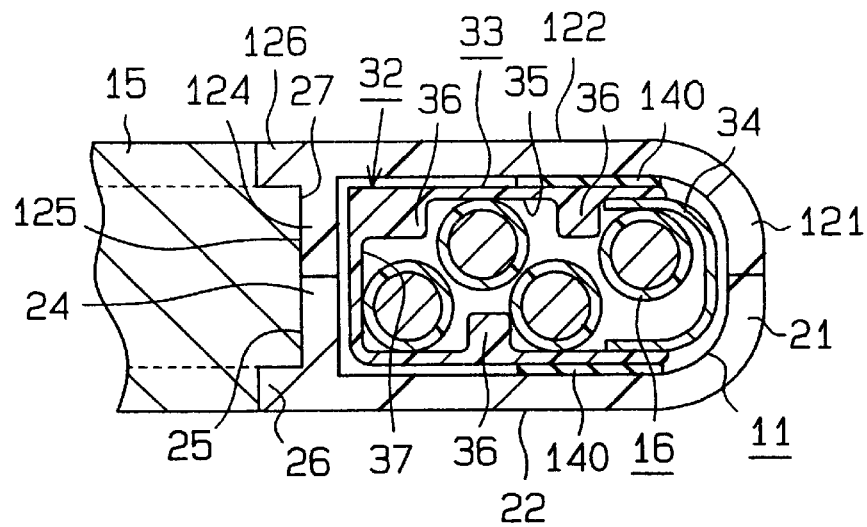
FIG. 5 is a cross sectional view of an end portion of a power supply coupler of another preferred embodiment according to the present invention.

FIG. 5 shows another preferred embodiment of a power supply coupler according to the present invention. The power supply coupler shown in FIG. 5 has the same structure as that shown in FIGS. 1 to 3, with the exception of the interconnection members.

In FIG. 5, the interconnection members are assigned with reference numeral 140. Each of the interconnection members 140 is made of a rubber sheet. Each of the interconnection members 140 has the same semicircular ring shape as those in the first embodiment. The interconnection members 140 are located near the distal end of the case 11 and contact both sides of the bobbin 32a and the adjacent lower and upper coupler halves 21, 121 as in the first embodiment. Installing the interconnection members 140 is accomplished by, for example, placing the interconnection members 140 over the sides of the bobbin 32 of the coil 16, placing the bobbin 32 into the lower half 21 and mating the upper half 121 to the lower coupler half 121. The interconnection members 140 compresses when the lower and upper coupler halves 21, 121 are joined.

When the power supply coupler includes the interconnection members 140, if an operator accidentally drops the power supply coupler, the force acting on the case 11 is partially absorbed by the interconnection members 140 and partially transferred to the coil assembly. Thus, the impact acting on the case 11 is dissipated to the case and the coil assembly. For this reason, the impact acting on the case 11 is effectively alleviated and the plastic case 11 resists scattering.

The rubber forming the interconnection members 140 is preferably a silicone rubber. Silicone rubber has a high heat-resistance and, therefore, there is no deterioration in its impact absorbing capability due to the heat produced by the coil 16. If desired, the silicone rubber may be replaced with fluorine rubber, which has a higher heat-resistance than silicone rubber.

Figure 6:
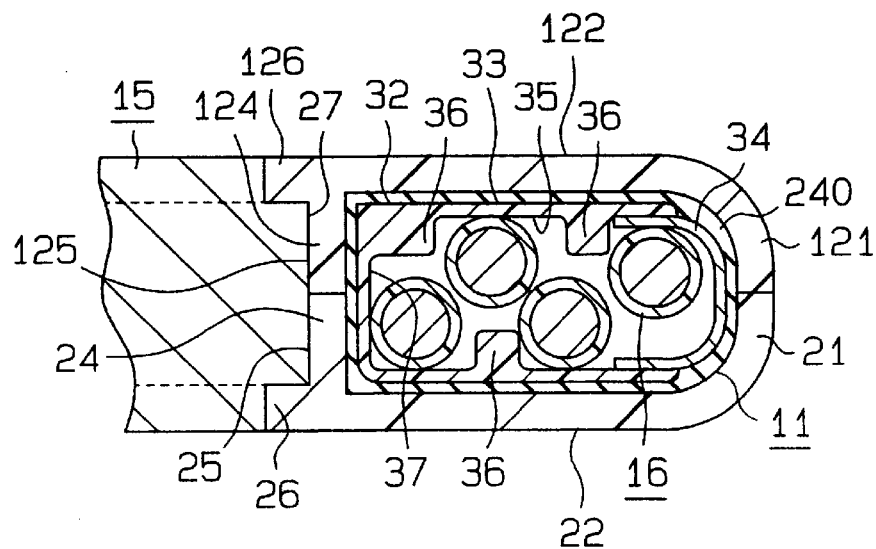
FIG. 6 is a cross sectional view of an end portion of a power supply coupler of still another preferred embodiment according to the present invention.

FIG. 6 shows another preferred embodiment of a power supply coupler according to the present invention. The power supply coupler shown in FIG. 6 has the same construction as that shown in FIGS. 1 to 3, with the exception of the interconnection members.

In FIG. 6, the interconnection member is assigned with a reference numeral 240. The interconnection member 240 is unitary and is located between the case 11 and the bobbin 32 of the coil assembly.

The interconnection member 240 is formed by, for example, venting the air from the inside of the upper coupler half 121 via a port (not shown) formed in the upper coupler half 121 while, at the same time, injecting potting material into the upper coupler half 121 via another port (not shown). The ports of the upper coupler half 121 are plugged by the potting material or other suitable material. Also, it is possible to employ, as the potting material 240, a two-pot type plastic or rubber, which is initially liquid and subsequently hardens after the filling step.

Even if an operator drops the power supply coupler to the ground, since the bobbin of the coil assembly is coupled to the case 11 by the interconnection member 240, the force acting on the case 11 is effectively dissipated and transferred the coil 16, and the impact is thus alleviated and absorbed by the coil 16. The power supply coupler therefore resists damage from impact with other objects. The power supply coupler of the embodiment is more impact-resistant than the other embodiments.

As already discussed, the power supply couplers of the preferred embodiments according to the present invention have the interconnection members 40, 140, 240 between the case 11 and the coil 16 to transfer impact forces to the coil 16. Since the case 11 is incorporated with the coil 16 in a unitary structure, even if the case 11 is subject impacted, the impact will be effectively dissipated by both the case 11 and the coil assembly. For this reason, although the case 11 is made of plastic, the case 11 resists damage. Thus, the power supply coupler has a long life and is highly reliable in operation.

It should be apparent to those skilled in the art that the present invention may be embodied in many other specific forms without departing from the spirit or scope of the invention. Particularly, it should be understood that the invention might be embodied in the following forms.

In the preferred embodiments discussed above, although the interconnection members 40, 140, 240 have been described as being made of potting material or rubber, the present invention is not limited to these materials. Other suitable shock absorbing materials may be used. For example, the interconnection members may be made of, for example, foamed plastic or completely hardened plastics. The interconnection members 40, 140 and 240 may be of the type to cause the impact acting on the case 11 to escape to the coil assembly.

Also, in the preferred embodiments of the power supply couplers discussed with reference to FIGS. 1 to 4 and FIG. 5, although the interconnection members 40, 140 have been described as having a semicircular configuration, they may have an annular configuration.

In the above-discussed preferred embodiments, although the wire 38 of the coil 16 was described as comprising a plurality of adjacent rings formed by wires wound around the cylindrical wall section 37 of the bobbin body 33, the coil 16 may be formed by winding the wire around the cylindrical wall section 37 such that the rings overlap in the axial direction.

In the above-noted preferred embodiments, although the coil 16 is accommodated in the bobbin 32 and the interconnection members 40, 140, 240 are located between bobbin 32 and the case 11, the coil may be directly mounted inside the case and interconnection members may be located between the coil and the case.

In the above-discussed embodiments, although the distal end of the power supply coupler 100 is formed in a paddle configuration, the distal end portion may be modified to have another shape such as a gun-type configuration.

What is claimed is:

1. A power supply coupler for a battery charging device, wherein the coupler is connected to a power supply device by a cable and is selectively connected to and disconnected from the battery charging device, the coupler comprising:
    a hollow case;
    a core accommodated in the case;
    a coil located around the core in the case; and
    an interconnection member located between the coil and the case to transfer forces acting on the case to the coil.

2. A power supply coupler according to claim 1, wherein the interconnection member occupies only part of the space.

3. A power supply coupler according to claim 1, wherein the interconnection member occupies all of the space.

4. The power supply coupler according to claim 1, further comprising:
    a bobbin body accommodated in the case, wherein the coil is wound around the bobbin body; and
    a cover accommodated in the case and coupled to the bobbin body, wherein the interconnection member is located on the bobbin body.

5. The power supply coupler according to claim 4, the bobbin body further comprising:
    a pair of parallel walls; and
    a cylindrical wall formed between the parallel walls at one end of the parallel walls thereof, thereby forming a channel shaped body.

6. The power supply coupler according to claim 5, wherein the hollow case contains an upper and a lower coupler half each half having a side wall that is parallel to the parallel walls of the bobbin body.

7. The power supply coupler according to claim 6, wherein the interconnection member is located between the side wall of the upper and lower coupler halves and the parallel walls of the bobbin body.

8. The power supply coupler according to claim 7, wherein the interconnection member is located on an end of the bobbin body parallel walls that is opposite the cylindrical wall.

9. The power supply coupler according to claim 7, wherein the interconnection member is semi-circular.

10. A power supply coupler for a battery charging device, wherein the coupler is connected to a power supply device by a cable and is selectively connected to and disconnected from the battery charging device, the coupler comprising:
    a plastic case, one end of which is an inserter portion that has a hollow paddle shape;
    a core accommodated in the inserter portion;
    a coil located around the core; and
    an interconnection member located between the inserter portion and the coil for transferring forces acting on a distal end of the inserter portion to the coil.

11. A power supply coupler according to claim 10, wherein the interconnection member is located only between a first area, which forms the distal end of the inserter portion, and a second area, which is a surface of the coil that faces the first area.

12. A power supply coupler according to claim 11, wherein the interconnection member is compressed between the case and the coil.

13. A power supply coupler according to claim 11, wherein the interconnection member occupies all of the space.

14. The power supply coupler according to claim 10 further comprising:
    a bobbin body accommodated in the case, wherein the coil is wound around the bobbin body; and
    a cover accommodated in the case and coupled to the bobbin body, wherein the interconnection member is located on the bobbin body.

15. A power supply coupler for a battery charging device, wherein the coupler is connected to a power supply device by a cable and is selectively connected to and disconnected from the battery charging device, the coupler comprising:
    a hollow case;
    a core accommodated in the case;
    a coil located around the core in the case; and
    means for transferring force from the case to the coil.

* * * * *